United States Patent
Upstill et al.

(10) Patent No.: US 10,223,461 B1
(45) Date of Patent: *Mar. 5, 2019

(54) IDENTIFYING LANGUAGES RELEVANT TO RESOURCES

(71) Applicant: Google LLC, Mountain View, CA (US)

(72) Inventors: Trystan G. Upstill, Palo Alto, CA (US); Matteo Slanina, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 14/960,077

(22) Filed: Dec. 4, 2015

Related U.S. Application Data

(63) Continuation of application No. 13/305,626, filed on Nov. 28, 2011, now Pat. No. 9,208,231.

(60) Provisional application No. 61/418,824, filed on Dec. 1, 2010.

(51) Int. Cl.
*G06F 17/30* (2006.01)
*G06F 3/0484* (2013.01)
*G06F 3/0482* (2013.01)

(52) U.S. Cl.
CPC ...... *G06F 17/30867* (2013.01); *G06F 3/0482* (2013.01); *G06F 3/04842* (2013.01); *G06F 17/3053* (2013.01); *G06F 17/30684* (2013.01); *G06F 17/30864* (2013.01)

(58) Field of Classification Search
CPC ......... G06F 17/30654; G06F 17/30675; G06F 17/30864; G06F 17/30684; G06F 17/30867; G06F 17/30011; G06F 17/30861; G06F 17/301; G06F 17/30386; G06F 17/30663

See application file for complete search history.

(56) References Cited

U.S. PATENT DOCUMENTS

| | | |
|---|---|---|
| 6,990,628 B1 | 1/2006 | Palmer et al. |
| 8,380,488 B1 | 2/2013 | Liu et al. |
| 2004/0194099 A1 | 9/2004 | Lamping et al. |
| 2004/0215606 A1 | 10/2004 | Cossock |
| 2006/0025988 A1 | 2/2006 | Xu et al. |
| 2006/0265360 A1 | 11/2006 | Su et al. |

(Continued)

OTHER PUBLICATIONS

Finkelstein, Lev, et al. "Placing search in context: The concept revisited." Proceedings of the 10th international conference on World Wide Web. ACM, 2001.*

(Continued)

*Primary Examiner* — Nan Hutton
(74) *Attorney, Agent, or Firm* — Fish & Richardson P.C.

(57) ABSTRACT

Methods, systems, and apparatus, including computer programs encoded on a computer storage medium, for identifying languages that are relevant to resources. In one aspect, a method includes selecting in a data processing apparatus a first resource; accessing click data that identifies, for each of a plurality of requests for the first resource, a respective search engine user interface from which the request was received; identifying a search engine user interface language for each of the plurality of requests based on the click data; determining a respective language relevance score for the first resource for each identified search engine user interface language; and selecting one or more languages as being relevant to the first resource based on the language relevance scores.

24 Claims, 3 Drawing Sheets

(56) References Cited

U.S. PATENT DOCUMENTS

2006/0294100 A1   12/2006  Meyerzon et al.
2007/0288448 A1* 12/2007  Datta .................. G06F 17/2795
2009/0055392 A1*  2/2009  Gupta ............... G06F 17/30867
2011/0213761 A1*  9/2011  Song ................. G06F 17/30867
                                                                                          707/706

OTHER PUBLICATIONS

Croft, W. Bruce, Stephen Cronen-Townsend, and Victor Lavrenko. "Relevance Feedback and Personalization: A Language Modeling Perspective." DELOS Workshop: Personalisation and Recommender Systems in Digital Libraries. vol. 3. 2001.*

Allan, James, et al. "Challenges in information retrieval and language modeling: report of a workshop held at the center for intelligent information retrieval, University of Massachusetts Amherst, Sep. 2002." ACM SIGIR Forum. vol. 37. No. 1. ACM, 2003.

Gonzalo, Julio, Paul Clough, and Jussi Karlgren. "Overview of iCLEF 2008: search log analysis for Multilingual Image Retrieval." Evaluating Systems for Multilingual and Multimodal Information Access. Springer Berlin Heidelberg, 2009. 227-235.

* cited by examiner

IDENTIFYING LANGUAGES RELEVANT TO RESOURCES

CROSS REFERENCE TO RELATED APPLICATION

This application is a continuation of and claims priority to pending U.S. patent application Ser. No. 13/305,626, filed Nov. 28, 2011, entitled "Identifying Languages Relevant to Resources," which in turn claims priority to U.S. Patent Application No. 61/418,824, filed Dec. 1, 2010, entitled "Identifying Languages Relevant to Resources." The entire contents of the foregoing applications are incorporated by reference herein in their entirety.

BACKGROUND

This specification relates to identifying languages that are relevant to resources.

The Internet enables access to a wide variety of resources, such as video and audio files, web pages for particular subjects, and news articles. Because the Internet connects many different parts of the world, the resources are in many different languages. Additionally, a resource written in a particular language may also be of interest to users who speak other languages. For example, a web page for an English soccer team that includes videos of a particular soccer player from Spain may be of interest to Spanish-language users even though the web site is written in English. Often, however, it is difficult to detect precisely the language of the resource or the languages that are relevant to the resource.

SUMMARY

This specification describes technologies relating to identifying languages that are relevant to resources.

In general, one innovative aspect of the subject matter described in this specification can be embodied in methods that include the actions of selecting in a data processing apparatus a first resource; accessing click data that identifies, for each of a plurality of requests for the first resource, a respective search engine user interface from which the request was received; identifying a search engine user interface language for each of the plurality of requests based on the click data; determining a respective language relevance score for the first resource for each identified search engine user interface language; and selecting one or more languages as being relevant to the first resource based on the language relevance scores. Other embodiments of this aspect include corresponding systems, apparatus, and computer programs, configured to perform the actions of the methods, encoded on computer storage devices.

These and other embodiments can each optionally include one or more of the following features. Associating with the first resource in a resource index information identifying the one or more languages identified as being relevant to the first resource. Receiving a search query from a search engine user interface in a particular language; and adjusting a search result score of the first resource based on the particular language being one of the one or more languages selected as being relevant to the first resource. Selecting one or more languages as being relevant to the first resource comprises selecting only search engine user interface languages for which the language relevance score exceeds a threshold value as being relevant to the first resource. The respective language relevance scores are based on a number of requests associated with each search engine user interface language. Determining the respective language relevance score for the first resource for each identified search engine user interface language comprises: assigning a weight to each of the plurality of requests for the first resource; and calculating the respective language relevance scores based on the assigned weights. A weight for a particular request is based on a probability that a user submitting the particular request understands the language of the first resource. A weight for a particular request is based on a duration of a visit to the first resource resulting from the particular request. A weight for a particular request is based on a search engine user interface language corresponding to the particular request. A weight for a particular request is based on a position of a search result selected by a user to initiate the particular request in an order of presentation of search results. A weight for a particular is based at least in part on where in an order of presentation of search results a search result referencing the resource was located relative to search results referencing resources in a native language of the user.

Particular embodiments of the subject matter described in this specification can be implemented to realize one or more of the following advantages. Relevant languages can be identified for resources that do not include textual content, for example, web pages that include only images. Resources that are multilingual, i.e., contain content in multiple languages, can be disambiguated. For example, a resource directed to teaching French to English speakers that has an equal amount of text in French and English can be determined to be relevant to English speakers and not French speakers. Multiple relevant languages can be identified for a resource that is of interest to users speaking different languages. For a particular query, a search result referencing a resource that is of interest to users speaking the language of the particular query can be promoted over a search result referencing a resource that is not of interest to users speaking the language. The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
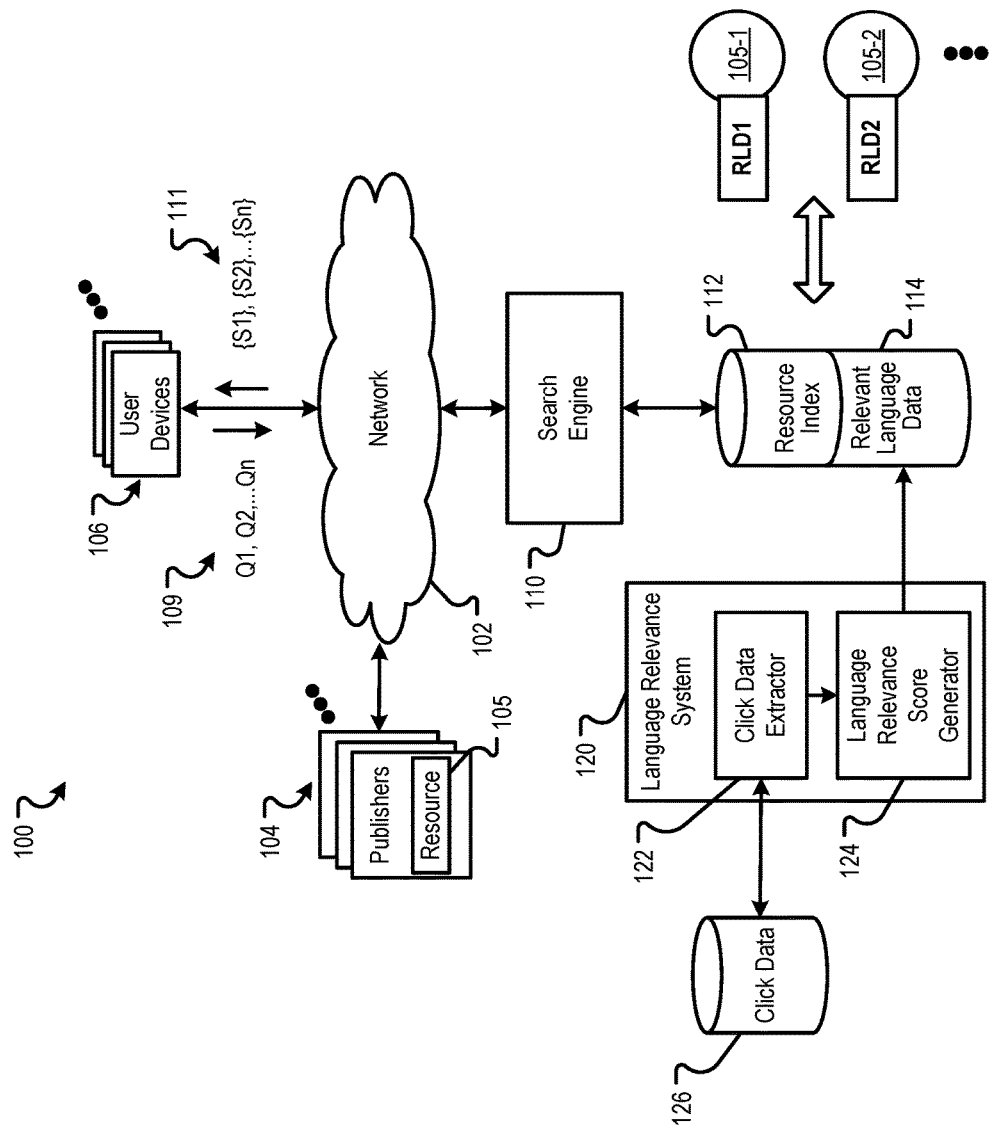
FIG. 1 is a block diagram of an example environment in which a language relevance system can be used.

FIG. 1 is a block diagram of an example environment in which a language relevance system 120 can be used. A computer network 102, for example, a local area network (LAN), wide area network (WAN), the Internet, or a combination thereof, connects publishers 104, user devices 106, and a search engine 110. The online environment 100 can include many thousands of publishers 104 and user devices 106.

The publishers 104 host web sites that provide electronic access to resources by use of the network 102. A web site is one or more resources 105 associated with a domain name. An example web site is a collection of web pages formatted in hypertext markup language (HTML) that can contain text, graphic images, multimedia content, and programming elements, e.g., scripts.

A resource is any data that can be provided by the publisher 104 over the network 102 and that is associated with a resource address. Resources include HTML pages, documents (e.g., word processing or portable document format (pdf) documents), images, video, and feed sources. The resources include content, e.g., words, phrases, or images, and can include embedded information (such as meta information and hyperlinks) and/or embedded instructions (such as JavaScript scripts).

A user device 106 is an electronic device that is under the control of a user and is capable of requesting and receiving resources over the network 102. Example user devices 106 include personal computers, mobile communication devices, tablet devices, and other devices that can send and receive data over the network 102. A user device 106 typically includes a user application, e.g., a web browser, to facilitate the sending and receiving of data over the network 102.

As there are many publishers, there is a large number of resources 105 available over the network 102. To facilitate searching of these resources, the search engine 110 crawls and indexes the resources provided by the publishers 104. The indexed and, optionally, cached copies of the resources are stored in a resource index 112.

The user devices 106 submit search queries 109 to the search engine 110 using a user interface provided by the search engine 110. Because user devices 106 can be located in many different countries and be used by users that speak many different languages, the search engine 110 can provide various user interfaces in different languages to allow users that speak particular languages or access the search engine from particular countries to use the search engine. Each user interface provided by the search engine is identified by a respective unique resource locator. For instance, a search engine can have a main user interface identified by the URL http://www.searchengine.com, but also many other location-specific user interfaces, for example http://www.searchengine.au (specific to Australia, and written in English), http://www.searchengine.uk (United Kingdom, English), http://www.searchengine.fr (France, French), and http://www.searchengine.es (Spain, Spanish). The search engine can also offer interfaces that are specific to regions, for example, Catalonia, Scotland, and Sicily.

In some implementations, if a user attempts to access a main search engine user interface from a particular country, they are automatically re-directed to the search engine user interface for that particular country. For example, when a user from France attempts to visit http://www.searchengine.com, they are automatically re-directed to http://www.searchengine.fr, which is written in French.

Furthermore, a search engine user interface can allow users to select between multiple possible interface languages. For example, the search engine interface http://www.searchengine.com can allow a user to select an option of viewing the interface in English, French, or Korean. The search engine 110 can store the user's language selection and can display the interface in the selected language for the user's subsequent visits to the interface.

In response to the search queries 109, the search engine 110 uses the resource index 112 to identify resources that are relevant to the queries. The search engine 110 identifies the resources in the form of search results 111 and returns the search results 111 to the user devices 106 in search results pages. A search result 111 is data generated by the search engine 110 that identifies a resource that satisfies a particular search query, and includes a resource locator for the resource. An example search result 111 can include a web page title, a snippet of text extracted from the web page, and the URL of the web page. The URL can be provided in the form of a hyperlink to the web page.

The search results are ranked (i.e., placed in an order) according to respective scores determined for each of the resources identified by the search results. The scores can be based on many different factors and generally relate to both the quality and the relevance of the corresponding resource. The search results 111 are provided to the user device according to the ranking.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

There are many factors that the search engine 110 considers when determining the relevance of a resource to a query. Among these factors is whether users who speak a particular language would be interested in the resource, i.e., the relevance of one or more languages to the resource. Therefore, a language relevance system 120 is used to identify languages that are relevant to resources. The language relevance system 120 processes the languages of search engine user interfaces used to request a particular resource in order to identify languages that are relevant to that resource.

In some implementations, the language relevance system 120 includes a click data extractor 122 and a language relevance score generator 124. The partitioning of the functionality of the language relevance system 120 between the click data extractor 122 and the language relevance score generator 124 is illustrative only. Additional partitioning of the functions described below can be implemented, or, alternatively, the language relevance system 120 can be a single software engine that performs all of the functions described below.

In some implementations, for each of the resources 105, the click data extractor 122 accesses click data stored in a click data store 126. For each resource 105, the click data is information about each request for the resource resulting from a search query submitted to search engine 110. In other words, the click data store 126 contains data for each time a user requests the resource by selecting a search result provided by the search engine 110.

For each request of a resource, the click data identifies the search engine user interface used to submit the request. In some implementations, in order to protect user privacy, the click data is anonymized to remove any user-identifying information so that resources requested by users cannot be associated with a particular user or their browsing history. Based on the click data, the click data extractor 122 identifies the language associated with the search engine user interface. For example, the language of the request can be determined from a country code included in the resource locator of the search engine user interface. Each country code is associated with a particular language, i.e., the language the search user interface for that country is written in. For example, the country code "uk" is associated with English (www.searchengine.uk), "br", the country code for Brazil, with Portuguese (www.searchengine.com/br or www.searchengine.com.br), and "ru" with Russian (www.searchengine.com/ru or www.searchengine.ru). In some implementations, the click data specifies the user interface for each request, e.g., by its country code, and the click data extractor 122 identifies the language of each user interface based on the language corresponding to the user interface. Thus, for example, for a user click on a presented search result from www.searchengine.com/ru, the click data extractor 122 uses the association of the country code "ru" to associate the click with Russian.

Alternatively, the click data for the resource can identify the language of the user interface for each request instead of or along with the identified user interface. For example, for a user click on a presented search result from www.searchengine.com, the click data can identify that the user had chosen to view the interface in Spanish, and can identify Spanish as the language associated with that click.

The click data for each resource optionally includes other information about each request for the resource. For instance, the click data can include information about the duration of the visit to the resource resulting from each request. For example, the click data can indicate the time that elapses before a user navigates back to a search results page after requesting the resource. If the user does not navigate back to the search results page, this can also be included in the click data.

Alternatively or additionally, the click data can include a likelihood that the user submitting the request is a multi-lingual user, i.e., that the user understands the language of the search-engine user interface they are using in addition to at least one other language. The likelihood that the user submitting the request is multi-lingual can be based on the language preferences of the user, e.g., whether the user's language settings for the search engine 110 indicate that the user understands two or more languages. The user's language settings can, for example, be provided by the user to the search engine. The likelihood can also be based on other information, for example, whether the user selected an option to translate the resource provided by the search engine 110 (presumably because the user did not understand the original language of the resource).

In some implementations, in order to protect user privacy, the information about the request for the resource is anonymized to remove any user-identifying information. Therefore, information about duration of visits or likelihoods of being multi-lingual cannot be associated with particular users or their browsing history.

Thus, for each resource 105, the click data extractor 122 can use the click data to identify each user interface language which has been used to request that resource. The language relevance score generator 124 generates language relevance scores for each identified language based, in part, on the number of requests for the resource corresponding to the language. In some implementations, the language relevance score for a particular language is the fraction of all requests for the resource specified in the click data that come from users of search engine user interfaces written in the particular language. That is, the language relevance score (LRS) for a language N is:

$LRS_N = R_N/R_T,$ where $R_N$ is the number of requests for the resource from search engine user interface language N and $R_T$ is the total number of requests for the resource from all search engine user interface languages.

In addition to or instead of the language relevance scores, country-specific and/or region-specific scores can also be generated for the resource. The country or region specific score for a particular country or region can be the fraction of all requests for the resource in the click data that resulted from clicks on search results presented in user interfaces corresponding to the country or region, as indicated, for example, by the resource locator of the user interface. The country or region associated with a search engine user interface for a particular request can also be identified by the language relevance system 120 from information about the user device submitting the request. For example, the IP address of a user device submitting a request can be used to identify the country or language associated with the request. Like the click data, this information can be anonymized to remove any user-identifying information. In some implementations, the country or region specific scores are used to generate language relevance scores, e.g., by mapping each country or region to a language associated with the country or region.

In some implementations, the language relevance score generator 124 assigns a weight to each request for a resource and uses those weights when calculating the language relevance score for that resource. In these cases, the language relevance score for a language N can be:

$LRS_N = AR_N/AR_T,$ where $AR_N$ is the sum of the weights of the requests for the resource from search engine user interface language N and $AR_T$ is the sum of the weights for all of the requests for the resource from all search engine user interface languages. The weight assigned to each request can be based on a number of different factors.

For example, the weight can be based on the duration of the visit to the resource resulting from the request, as indicated by the click data. If a user requests a resource and quickly returns to the search results page, it may be an indication that the user did not understand the language of the resource. Thus, a request that results in a short visit can be assigned a smaller weight than a request that results in a longer visit or a request that does not result in a return to the search results page.

The weight can also be based on the probability that the user submitting the request understands the language of the resource. This probability can be based on, for example, the likelihood that the user submitting the request is multi-lingual. Because of the increased likelihood that a multi-lingual user understands the language of a requested resource, there is a possibility that the resource is not of interest to users of that user-interface language who do not understand more than one language. Thus, requests for a resource from users with high likelihoods of being multi-lingual can be assigned a lower weight than requests from users who are not likely to be multi-lingual. The likelihood of a user being multi-lingual can be obtained from click data as described above.

The probability that the user submitting the request understands the language of the resource can also be correlated with the search engine user interface used by the user. For example, if a much larger percentage of users from Switzerland are bilingual than are users from Russia, it could be advantageous to have a smaller weight for requests from a search engine user interface corresponding to Switzerland.

In some implementations, conventional language detection techniques are used to detect the language of the search query corresponding to the request. If the language of the query does not match the language of the search engine user interface, the weight for the request can be reduced or, alternatively, set to zero. The language of the search query can also be inferred from user language preferences obtained from the click data. For example, if a query in English is submitted from a French search engine user interface, it is less likely that the resource requested is of interest to French speakers than if the query was submitted in French because there is a higher chance that either the user is multi-lingual or that the user is simply an English-language speaker using the French search engine user interface.

All requests from particular search engine user interfaces or from search engine user interfaces in a particular language can also be weighted to reflect the fact that certain user interfaces and languages have a larger number of users and/or have users with different click habits. For example, because a large percentage of traffic comes from English-language search engine interfaces, the weights for those requests can be lowered, and weights for languages with a relatively small amount of traffic, e.g., Swahili, can be increased. This can ensure that the language relevance score for Swahili is not too low simply because there are inherently many more English-language users.

Additionally, users of certain search engine interfaces may be more prone to clicking on search results than users of other interfaces. For example, if it were shown that English-language users click on a much larger percentage of search results than Japanese-language users without regard for their interest in the results, the weight of requests from Japanese-language search engine user interfaces could be increased with respect to requests from English-language interfaces. Other weight adjustments based on the click habits of users from particular countries or who speak particular languages are also possible.

Furthermore, the weight for a request can be adjusted based on where in the listing of search results, i.e., where in an order of presentation of search results, the search result referencing the resource was located. If, for example, the search result for the resource was low in an order of search results and was nonetheless selected by a user, the weight for that request of the resource can be increased. Conversely, the weight for requests that result from a user clicking the top result in search results can be decreased, since users may tend to click the first result without regard for the language it is in.

Additionally, the weight for the request can be based on where in the listing of search results the search result referencing the resource was located relative to search results that are known to be in the native language of the user. For example, if the user skipped over resources that are known to be in the native language of the user, e.g., in the same language as the search engine user interface or in the same language as the user's language preferences, to access a particular resource, the weight for the request of the particular resource can be increased. In some implementations, the weight for the request can be increased in varying amounts based on how many search results referencing resources in the user's native language were present in the listing of search results and the position of those search results relative to the position of the search result referencing the particular resource.

Alternatively, the weight can be assigned based on a combination of two or more of the above factors. The weights for each factor can be, for example, multiplied together to obtain the final weight for the request. Once the weights for each request are determined, the language relevance score generator 124 generates a language relevance score for the resource as described above.

In some implementations, the language relevance score generator 124 can determine which requests to include in calculating language relevance scores for the resource and when to update the scores based on collection parameters. For example, the language relevance score generator 124 can use only requests for the resource within a specified period of time when calculating the language relevance scores. Additionally, the language relevance score generator 124 can update the language relevance scores, for example, at pre-defined intervals of time, or after a specified number of new requests for the resource are present in the click data.

The language relevance system 120 then uses the language relevance scores to generate relevant language data 114. The relevant language data 114 are data that indicate which languages are relevant to resources and how relevant those languages are. In some implementations, the relevant language data 114 for each resource are stored in the resource index 112 and associated with their corresponding resource. Accordingly, by accessing the resource index 112, the search engine 110 can identify the relevance of languages to corresponding resources.

In some implementations, only languages having language relevance scores above a certain threshold value are deemed to be relevant to the resource and are added to the relevant language data 114. To account for the fact that certain search engine user interface languages account for a large percentage of all internet traffic, the threshold value can be different for different languages. For example, because the number of internet users that use English-language search engine user interfaces far exceeds the number of users of Swahili-language search engine user interfaces, the threshold value for English can be higher than the threshold value for Swahili. Additionally, the number of languages that are considered relevant to the resource (e.g., the number of languages in relevant language data 114) can be limited to a specified number. In these cases, when the number of languages having scores greater than the threshold value exceeds a specified number N, only the top N languages based on their language relevance score will be deemed relevant to the resource.

In some implementations, the language relevance scores for a particular resource are combined with other language relevance measures for that resource to obtain a final language relevance measure before the languages that are relevant to the resource are determined. The other language relevance measures can be based on, for example, language detection tools that use a statistical analysis of the text in the resource to predict the language of the resource or language detection tools that use the languages of resources that link to a particular resource to predict the language of the resource.

For example, the resource 105-1 can be associated with relevant language data 114 RLD1, and the resource 105-2 can be associated with relevant language data 114 RLD2, and so on. In some implementations, the relevant language data 114 is a language relevance vector that includes language relevance scores $S_i$, each corresponding to one of a number of languages relevant to the language, e.g., $RLD=S_1, S_2, S_3 \ldots S_q$. For example, an example vector of relevant language data of a particular resource for the languages of German, French, and English can be:

$$RLD=[0.45, 0.82, 0.92]$$

The example vector above indicates that the resource is likely very relevant to the languages of French and English, as represented by the respective relevance scores of 0.82 and 0.92, and is less likely to be relevant to German, as indicated by the relevance score of 0.45. The resource could also have been accessed from users of Japanese-language interfaces and Chinese-language interfaces, but the language relevance scores for those languages, for example 0.04 and 0.03, were not high enough to exceed a threshold value and the languages were therefore not added to the vector.

Different ways of calculating the language relevance can be used, depending upon the implementation. For example, the language relevance scores can range from negative values to positive values, or the language relevance scores can be binary values that indicate whether the language relevance system 120 has determined that a language is relevant to a resource or is not relevant to a resource.

After the relevant language data 114 for a resource have been stored in the resource index 112 and associated with the resource, the search engine 110 can use the languages that are relevant to that resource and their scores when calculating or adjusting a score for the resource in response to received search queries. Thus, for resources identified as responsive to a received query, the individual scores for the resources can be adjusted based on the language relevance of the resource to the requesting user based on the language data and the language of the requesting user (e.g., the language of the requesting user's search interface).

For example, a resource for which English and French are the only relevant languages may be more relevant to a query written in English or French than to queries written in other languages, and thus the score for that resource for queries from English and French language user interfaces can be increased. Additionally, since a resource for which English and French are the relevant languages may not be as relevant to a query written in, for example, Japanese, the score for that resource for Japanese language queries can be decreased. In some implementations, the language relevance scores for the relevant languages are used in adjusting the score for the resource. In the above example, if the language relevance score for English was higher than the language relevance score for French, the adjustment to the score for the resource would be greater for queries in English than for queries in French.

Figure 2:
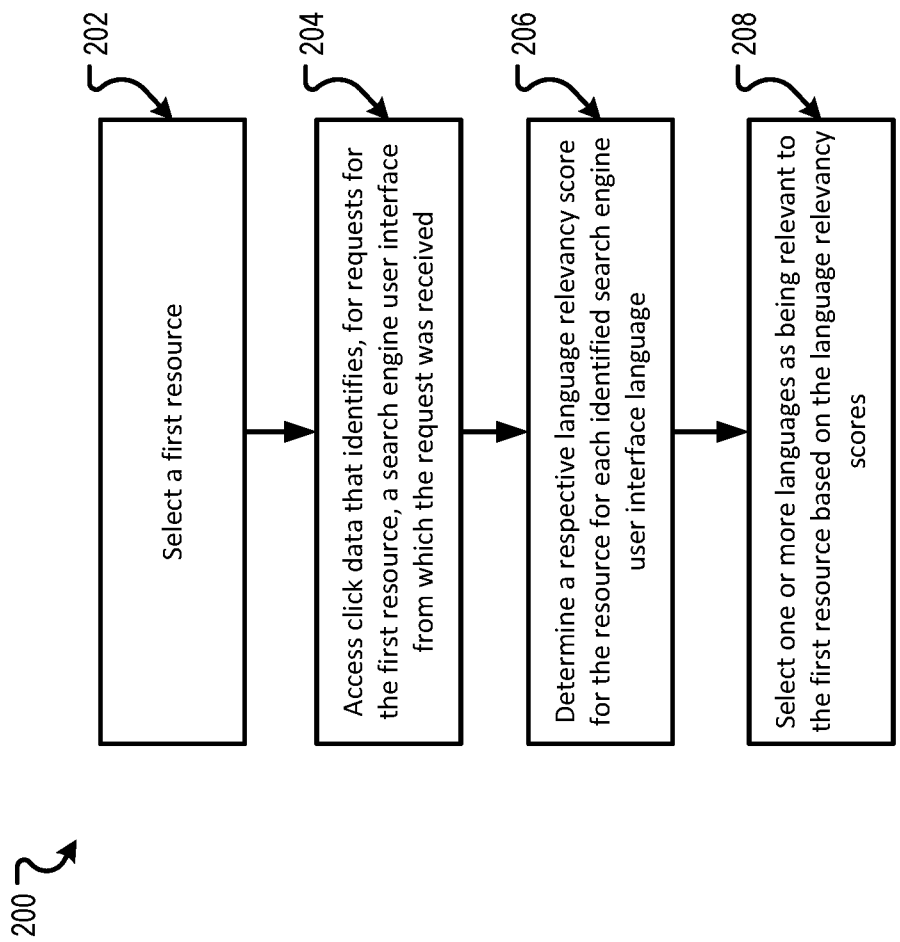
FIG. 2 is a flow diagram of an example process of identifying relevant languages for a resource.

FIG. 2 is a flow diagram of an example process 200 for identifying relevant languages for a resource. For convenience, the process 200 will be described with respect to a system of one or more computers. For example, a language relevance system, e.g., the language relevance system 120 of FIG. 1, can be used to perform the process 200.

The system selects a resource (202). The system can select the resource from a collection of resources. For example, the system can select the resource from an index of resources used by a search engine. Alternatively, the system can select the resource from a collection of resources having associated click data stored in a click data store.

The system accesses click data for the resource that identifies, for each request for the resource, a search engine user interface from which the request was received (204). The click data can also identify a search engine user interface language for the search engine user interface, e.g., the language that the search engine user interface is written in. Alternatively, the system can identify the language of the search engine user interface, e.g., based on a country code included in the resource locator for the search engine user interface.

The system determines a respective language relevance score for the resource for each identified search engine user interface language (206). The system can determine the respective language relevance scores based on the number of requests associated with each search engine user interface language relative to the total number of requests. For example, the language relevance score for a particular language can be the fraction of all requests for the resource specified in the click data that came from search engine user interfaces written in that language. Alternatively, the system can assign a weight to each request for the resource before determining the language relevance scores.

The system selects one or more languages as being relevant to the resource based on the language relevance scores (208). For example, the system can select only languages having language relevance scores exceeding a certain threshold as being relevant to the resource. In some implementations, the system associates the relevant languages and their language relevance scores with the resource in a resource index for use by a search engine in calculating a score for the resource in response to search queries.

Figure 3:
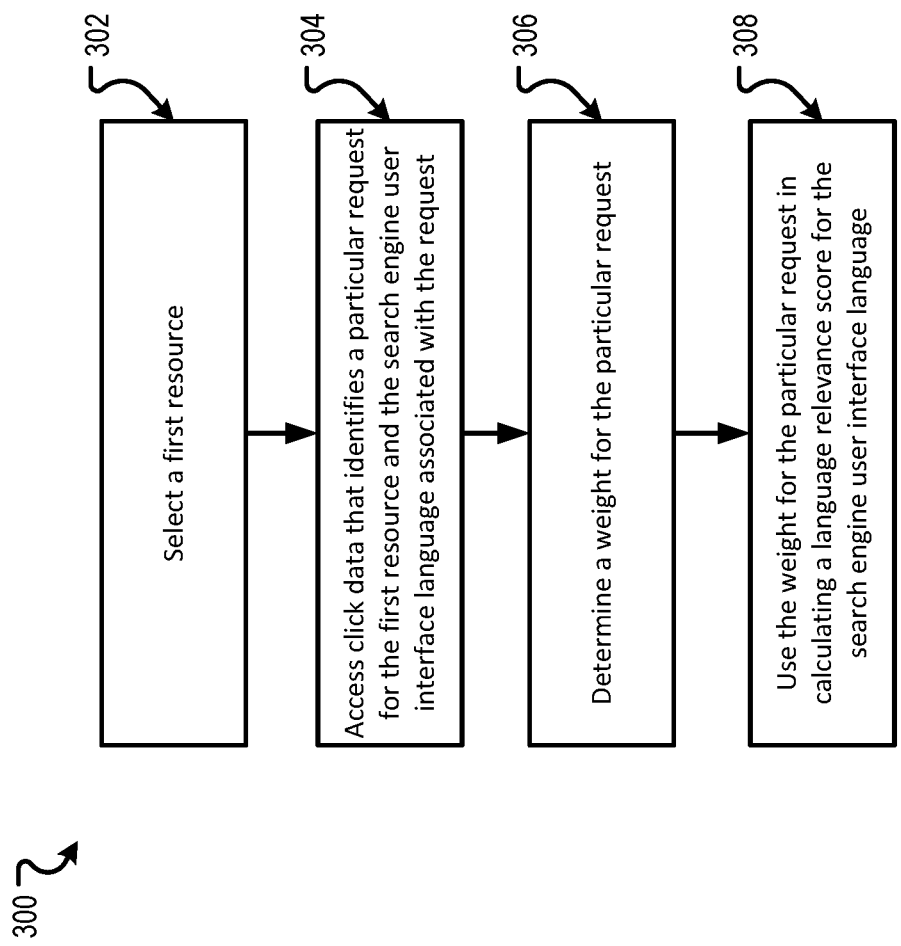
FIG. 3 is a flow diagram of an example process of identifying a weighting factor for a particular request for a resource.

FIG. 3 is a flow diagram of an example process 300 for identifying a weighting factor for a particular request for a resource. For convenience, the process 300 will be described with respect to a system of one or more computers. For example, a language relevance system, e.g., the language relevance system 120 of FIG. 1, can be used to perform the process 300.

The system selects a resource (302). The system accesses click data that identifies a particular request for the resource and the search engine user interface language associated with the request (304). The click data can also specify other characteristics of the request, for example, the duration of the visit resulting from the request and whether a user submitting the request was likely to be a multi-lingual user.

The system determines a weight for the particular request (306). The weight for the particular request can be based on information specified in click data, e.g., the duration of the visit resulting from the request. The weight for the request can also be based on, for example, the search engine user interface used to submit the request.

The system uses the determined weight in calculating a language relevance score for the search engine user interface language (308). For example, after weights for each request for the resource have been determined, the system can calculate the language relevance score for the search engine user interface language by summing up all of the weights for requests for that language, and dividing that sum by the sum of all of the weights for the resource.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for determining one or more relevant languages for a network-addressable resource, the method comprising:

accessing user selection data that identifies a plurality of search result selections that each requested the resource, wherein each search result selection represents a user selection of a respective search result referencing the resource, the respective search result being presented in a respective search engine user interface having a respective user interface language of a plurality of user interface languages;

determining, for each search result selection of the plurality of search result selections that each requested the resource, a respective user interface language of the plurality of user interface languages, wherein each respective user interface language for each search result selection is a respective language of a respective search engine user interface through which the search result selection occurred;

determining, for each user interface language of the plurality of user interface languages, a respective count of search result selections that requested the resource through a respective search engine user interface having the user interface language;

determining, for each user interface language from the respective counts of search result selections that requested the resource through a respective search engine user interface having the user interface language, a respective language relevance score for the resource and the user interface language; and designating one or more of the user interface languages as relevant languages of the resource based on the language relevance scores.

2. The method of claim 1, wherein each language relevance score is a measure of relevance of a respective user interface language to the resource.

3. The method of claim 1, wherein designating one or more of the identified user interface languages as relevant languages of the resource comprises designating, as relevant languages for the resource, only user interface languages having a language relevant score that satisfies a threshold.

4. The method of claim 1, wherein designating one or more of the identified user interface languages as relevant languages of the resource comprises designating, as relevant languages for the resource, only user interface languages having a language relevant score that satisfies a respective language-specific threshold.

5. The method of claim 1, wherein determining, from the respective counts, a plurality of language relevance scores for the resource, comprises weighting each count by a duration of a visit for a search result selection corresponding to the count.

6. The method of claim 1, wherein determining, from the respective counts, a plurality of language relevance scores for the resource, comprises computing, for each user interface language, a respective measure of a number of search result selections for the user interface language relative to a total number of search results selections.

7. The method of claim 1, wherein determining a respective user interface language for each search result selection comprises determining a user interface language of text of a search engine user interface through which the search result selection occurred.

8. The method of claim 1, wherein determining a respective user interface language for each search result selection comprises determining a language associated with a country code of a resource locator for a search engine user interface through which the search result selection occurred.

9. A system comprising:

one or more computers and one or more storage devices storing instructions that are operable, when executed by the one or more computers, to cause the one or more computers to perform operations comprising:

accessing user selection data that identifies a plurality of search result selections that each requested a network-addressable resource, wherein each search result selection represents a user selection of a respective search result referencing the resource, the respective search result being presented in a respective search engine user interface having a respective user interface language of a plurality of user interface languages;

determining, for each search result selection of the plurality of search result selections that each requested the resource, a respective user interface language of the plurality of user interface languages, wherein each respective user interface language for each search result selection is a respective language of a respective search engine user interface through which the search result selection occurred;

determining, for each user interface language of the plurality of user interface language, a respective count of search result selections that requested the resource through a respective search engine user interface having the user interface language;

determining, for each user interface language from the respective counts of search result selections that requested the resource through a respective search engine user interface having the user interface language, a respective language relevance score for the resource and the user interface language; and designating one or more of the user interface languages as relevant languages of the resource based on the language relevance scores.

10. The system of claim 9, wherein each language relevance score is a measure of relevance of a respective user interface language to the resource.

11. The system of claim 9, wherein designating one or more of the identified user interface languages as relevant languages of the resource comprises designating, as relevant languages for the resource, only user interface languages having a language relevant score that satisfies a threshold.

12. The system of claim 9, wherein designating one or more of the identified user interface languages as relevant languages of the resource comprises designating, as relevant languages for the resource, only user interface languages having a language relevant score that satisfies a respective language-specific threshold.

13. The system of claim 9, wherein determining, from the respective counts, a plurality of language relevance scores for the resource, comprises weighting each count by a duration of a visit for a search result selection corresponding the count.

14. The system of claim 9, wherein determining, from the respective counts, a plurality of language relevance scores for the resource, comprises computing, for each user interface language, a respective measure of a number of search result selections for the user interface language relative to a total number of search result selections.

15. The system of claim 9, wherein determining a respective user interface language for each search result selection comprises determining a user interface language of text of a search engine user interface through which the search result selection occurred.

16. The system of claim 9, wherein determining a respective user interface language for each search result selection comprises determining a language associated with a country code of a resource locator for a search engine user interface through which the search result selection occurred.

17. A computer program product, encoded on one or more non-transitory computer storage media, comprising instructions that when executed by one or more computers cause the one or more computers to perform operations comprising:

accessing user selection data that identifies a plurality of search result selections that each a network-addressable resource, wherein each search result selection represents a user selection of a respective search result referencing the resource, the respective search result being presented in a respective search engine user interface having a respective user interface language of a plurality of user interface languages;

determining, a respective user interface language for each request search result selection of the plurality of search result selections that each requested the resource, a respective user interface language of the plurality of user interface languages, wherein each respective user interface language for each search result selection is a respective language of a respective search engine user interface through which the search result selection occurred;

determining, for each user interface language of the plurality of user interface languages, a respective count of search result selections that requested the resource through a respective search engine user interface having the user interface language;

determining, for each user interface language from the respective counts of search result selections that requested the resource through a respective search engine user interface having the user interface language, a respective language relevance score for the resource and the user interface language; and designating one or more of the user interface languages as relevant languages of the resource based on the language relevance scores.

18. The computer program product of claim 17, wherein each language relevance score is a measure of relevance of a respective user interface language to the resource.

19. The computer program product of claim 17, wherein designating one or more of the identified user interface languages as relevant languages of the resource comprises designating, as relevant languages for the resource, only user interface languages having a language relevant score that satisfies a threshold.

20. The computer program product of claim 17, wherein designating one or more of the identified user interface languages as relevant languages of the resource comprises designating, as relevant languages for the resource, only user interface languages having a language relevant score that satisfies a respective language-specific threshold.

21. The computer program product of claim 17, wherein determining, from the respective counts, a plurality of language relevance scores for the resource, comprises weighting each count by a duration of a visit for a search result selection corresponding the count.

22. The computer program product of claim 17, wherein determining, from the respective counts, a plurality of language relevance scores for the resource, comprises computing, for each user interface language, a respective measure of a number of search result selections for the user interface language relative to a total number of search result selections.

23. The computer program product of claim 17, wherein determining a respective user interface language for each search result selection comprises determining a user interface language of text of a search engine user interface through which the search result selection occurred.

24. The computer program product of claim 17, wherein determining a respective user interface language for each search result selection comprises determining a language associated with a country code of a resource locator for a search engine user interface through which the search result selection occurred.

* * * * *